United States Patent [19]

Nagano

[11] 4,198,876
[45] Apr. 22, 1980

[54] MULTI-STAGE SPROCKET ASSEMBLY FOR A BICYCLE

[75] Inventor: Masashi Nagano, Sakai, Japan

[73] Assignee: Shimano Industrial Company Limited, Osaka, Japan

[21] Appl. No.: 958,974

[22] Filed: Nov. 9, 1978

[30] Foreign Application Priority Data

Nov. 14, 1977 [JP] Japan .................. 52-153062[U]

[51] Int. Cl.² ................. F16H 55/30; F16H 9/00
[52] U.S. Cl. ........................... 74/243 R; 74/217 B
[58] Field of Search ............... 74/243 R, 217 B, 594.2

[56] References Cited

U.S. PATENT DOCUMENTS

| | | | |
|---|---|---|---|
| 3,648,519 | 3/1972 | Nakata et al. | 74/217 B |
| 3,835,729 | 9/1974 | Tarutani | 74/594.2 X |
| 4,116,319 | 9/1978 | Nagano et al. | 74/243 R |

FOREIGN PATENT DOCUMENTS

| | | | |
|---|---|---|---|
| 2501481 | 7/1976 | Fed. Rep. of Germany | 74/243 R |
| 751720 | 9/1933 | France | 74/243 R |
| 1046731 | 12/1953 | France | 74/217 B |
| 1256502 | 2/1961 | France | 74/594.2 |
| 438275 | 8/1948 | Italy | 74/217 B |
| 502125 | 11/1954 | Italy | 74/243 R |

OTHER PUBLICATIONS

Gt. Britain reference to Allison, 1897, 1 page.

*Primary Examiner*—Leslie Braun
*Attorney, Agent, or Firm*—Stevens, Davis, Miller & Mosher

[57] ABSTRACT

A multi-stage sprocket assembly for a bicycle, including two or more sprockets, in which at least one of axially outermost sprockets is provided at the laterally outer surface of a body thereof with a plurality of projections extending axially outwardly of the sprocket, the projections being positioned circumferentially of the sprocket body and radially inwardly of the dedendum circle of the sprocket, so that a driving chain may, when riding over and coming off the sprocket, be stopped by the projections to thereby be reliably prevented from being jammed between the sprocket and a spoke, hub flange or crank arm at the bicycle.

8 Claims, 10 Drawing Figures

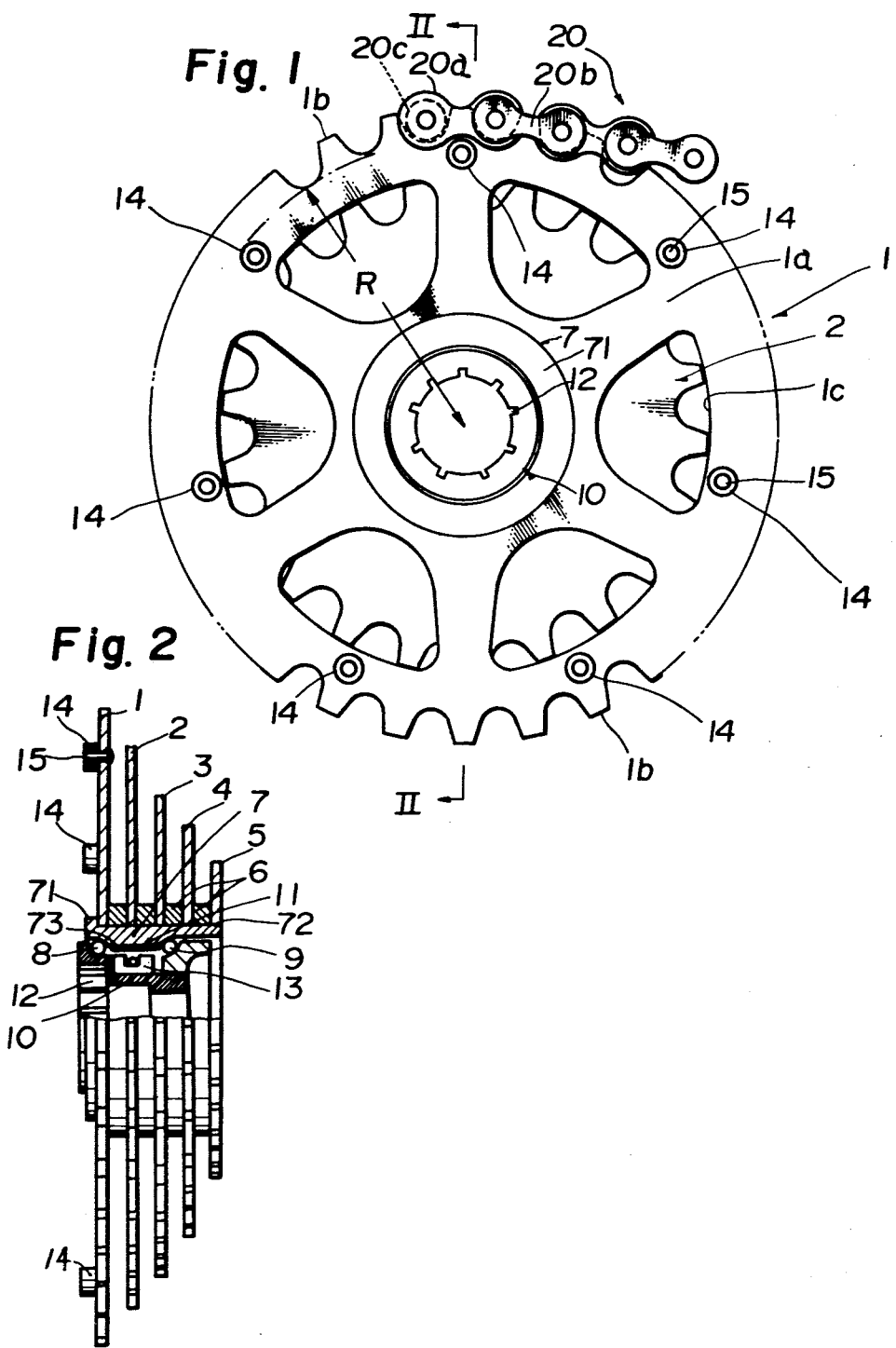

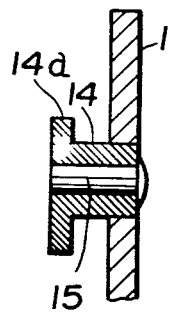
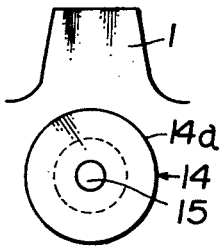
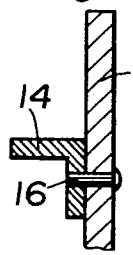
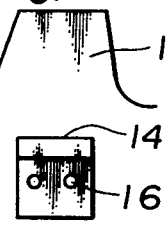
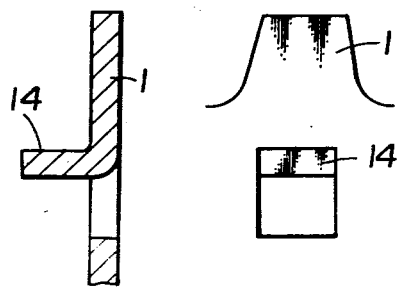
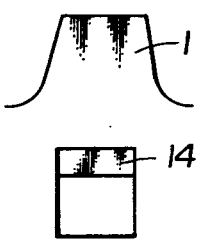
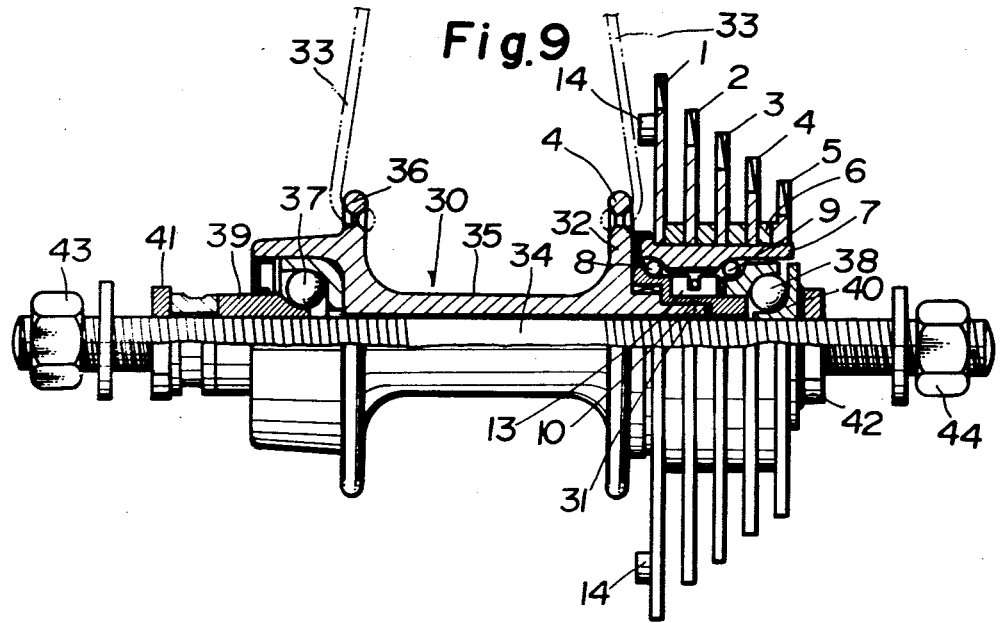

MULTI-STAGE SPROCKET ASSEMBLY FOR A BICYCLE

This invention relates to a multi-stage sprocket assembly used together with a driving chain to propel a bicycle, and more particularly to a multi-stage sprocket assembly including two or more sprockets of different diameter and teeth which are capable of meshing with the chain.

Generally, this kind of multi-stage sprocket assembly is mounted through a free rotation mechanism to a rear hub at the bicycle, or through the same mechanism or a fixing means to a crank mechanism having pedals. The assembly is used together with a derailleur which shifts the chain to mesh with a selected one of two or more sprockets for changing the bicycle speed.

When shifting the chain axially of the sprockets for changing the speed, the derailleur, if it malfunctions or is poorly adjusted, may cause the chain to ride over and come off the high or low speed sprocket at the axially outermost side of the sprocket assembly.

As a result, the chain, as it comes off the sprocket, is jammed between the outermost sprocket and a hub flange or spokes fixed thereto at the rear hub carrying the sprocket assembly, or between the sprocket and a crank arm carrying it at the crank mechanism.

When this occurs, the chain is subjected to the force of inertia due to its movement causing it to be more tightly jammed. Once the chain is jammed, it is difficult to remove and removal can result in damage to the chain, hub flange, spoke or crank arm.

In order to prevent the chain from coming off an outermost sprocket, a disc, such as a well-known spoke protector or chain guard, of larger diameter than the sprocket has conventionally been mounted at the outside of the axially outermost sprocket, the spoke protector being fixed usually to the rear hub axially outwardly of the hub flange thereof. Thus, the multi-stage sprocket assembly extends axially outwardly of the hub an additional amount corresponding to the thickness of a protector. In other words, the fixed interval of the bicycle frame compels the hub flange at the sprocket assembly side to shift toward the axial center of the rear hub to the extent of the thickness of the protector.

Accordingly, an offset of the center between hub flanges at both axial ends of the hub becomes larger with respect to the center of widthwise length of rim of the bicycle wheel, thereby raising/problem in the strength of the wheel.

Also, the aforesaid spoke protector or chain guard should be formed of a disc-like member larger in diameter than the axially outermost sprocket, whereby the sprocket assembly not only increases in weight but also becomes expensive.

The present invention has been designed in light of these problems. An object of the invention is to provide a multi-stage sprocket assembly of reduced weight which is inexpensive to produce, incorporated with the rear hub without increasing the aforesaid offset amount, and capable of reliably preventing the chain from coming off the sprocket during speed changes.

The invention is directed to provide at the axially outermost sprocket of a sprocket assembly a plurality of projections in place of a conventional spoke protector or chain guard. In detail, the projections are provided at the laterally outer surface of a body of at least one of the axially outermost sprockets of an assembly having two or more sprockets. The projections extend axially outwardly of the body, and are positioned circumferentially thereof and radially inwardly of the dedendum circle of the sprocket, so that the chain, when riding over and coming off the outermost sprocket, may be stopped by the projections, thereby being reliably prevented from being jammed in the manner described above.

These and other objects, features and advantages of the invention will be more apparent from the description of an embodiment thereof in accordance with the accompanying drawings, in which:

FIG. 1 is a front view of an embodiment of the invention,

FIG. 2 is a half sectional view taken on line II—II in FIG. 1,

FIGS. 3 through 8 show modified embodiments of projections,

FIGS. 3, 5 and 7 are sectional views thereof,

FIGS. 4, 6 and 8 are front views of the same, and

FIG. 9 is a half sectional view of the sprocket assembly of the invention, applied to the rear hub.

Figure 10:
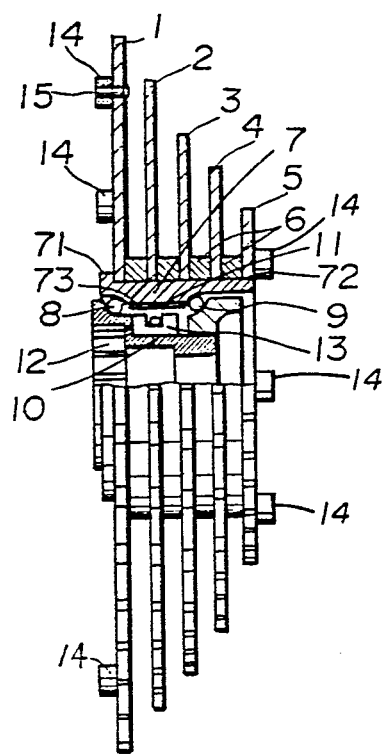
FIG. 10 is a view similar to FIG. 2 but showing projections on both outside sprockets.

The multi-stage sprocket assembly is, as shown in FIG. 9, used for the rear hub and is, as shown in FIG. 2, constructed of five different diameter sprockets 1 through 5, a cylindrical driving member 7 connecting the sprockets 1 through 5 at regular intervals therebetween by means of four collars 6, a cylindrical driven member 10 supporting the driving member 7 through a pair of bearings 8 and 9, and one-directional transmission 11 inserted between the driving member 7 and the driven member 10.

The sprocket assembly constructed as just described is well-known. The sprockets 1 through 5 are connected to the driving member 7 which is provided at the outer periphery thereof with a plurality of grooves (not shown) extending axially of the same. The driving member 7 is pivoted at the outer periphery of one axial end thereof with a flange 71 in engagement with the laterally outer surface of the low speed sprocket 1 having the largest diameter, and at the outer periphery of the other axial end with a screw thread 72. The sprockets 1 through 5 are provided with central bores through which the sprockets fit to the outer periphery of driving member 7, the central bores of sprockets 1 through 4 other than the high speed sprocket 5 having the smallest diameter having projections (not shown) engageable with the grooves respectively, the bore at the sprocket 5 being provided with a screw thread screwed with the thread 72. The sprockets 1 through 4 are inserted onto the driving member 7 in sequence from the largest diameter sprocket 1 while engaging the projections with the grooves respectively and then the sprocket 5 is screwed with the driving member 7.

The aforesaid assembly has been well known and further details are not shown, but will be apparent upon reference to the conventional embodiment.

The driven member 10 is provided at the inner periphery of one axial end thereof with a spline 12 and is spline-connected therethrough to a cylindrical bearing member 31 at a rear hub 30 to be hereinafter described. This construction is well-known and it will be apparent upon reference to the well-known multi-stage sprocket assembly that the spline can be readily replaced by a thread.

Furthermore, the one-directional transmission 11 is, as well-known, constructed of ratchet teeth 73 provided at the inner periphery of an axially intermediate portion of the driving member 7 and pawls 13 provided at the outer periphery of the driven member 10 which mesh with the ratchet teeth 73.

In brief, the above described multi-stage sprocket assembly used for the rear hug is well-known and those skilled in the art will understand its construction without further detailed explanation.

This invention is directed to providing at a multi-stage sprocket assembly constructed as described a plurality of projections 14 disposed circumferentially of the sprocket body of both (the low speed sprocket 1 or high speed sprocket 5 in the drawing) or at least one (the low speed sprocket 1 only) of the sprockets at the axially outermost sides of the assembly.

In detail, the projections 14 are provided at the laterally outer surface of body 1a of sprocket 1, positioned radially inwardly of the dedendum circle R thereof, and extend axially outwardly of the sprocket 1. Each projection 14 is so spaced that the chain 20 may, when it begins to ride over and come off the sprocket 1, be received by the projections 14 so as not to drop in and be jammed between the sprocket 1 and the hub flange 32 or spokes 33 fixed thereto as shown in FIG. 9; the spaced interval between projections being preferably about 3 to 4 pitches of the chain 20. Also, the axial length of each projection 14 depends upon width of the chain 20 and is necessary for receiving the chain 20 riding over the sprocket 1.

It is preferable for surfaces of sprocket strength to provide each projection 14 on the line connecting the center of thickness of a tooth 1b and the rotation center of sprocket 1. Hence, each projection 14 can approach the dedendum circle R of sprocket 1 and the sprocket body 1a can be reduced in weight by forming cutouts 1c as shown in FIG. 1.

The projections 14 are disposed radially inwardly of the dedendum circle R so that as the chain 20 meshes with the tooth 1b it is free from interference at its inner or outer link plates 20a or 20b with the projection 14, whereby each projection 14 is preferably provided as radially outwardly as possible in a range of no interference.

Each projection 14 is preferably columnar as shown in FIG. 1, and is fixed to the sprocket 1 by means of a pin 15 which perforates through the sprocket body 1a and is caulked thereto.

In addition, the projection 14 may be formed in a column having a flange 14a at its axial end as shown in FIGS. 3 and 4, the flange 14a having a diameter smaller than an interval between each roller 20c of the chain 20 so that the chain 20, when coming off the sprocket, may mesh with the flange 14a, thereby further reliably preventing the chain 20 from falling between a hub or spoke and the outermost sprocket.

Furthermore, the projection 14 may, as shown in FIGS. 5 to 8, be plate-like shaped rather than being columnar. Thus, an L-like shaped plate may be fixed by a pin 16 to sprocket 1 as shown in FIGS. 5 and 6, or the body 1a of sprocket 1 may be partially cut and raised at right angles as shown in FIGS. 7 and 8.

When the sprocket assembly, whose sprocket 1 provides the plurality of projections 14, is used for the rear hub 30 as shown in FIG. 9 and a derailleur (not shown) is operated to switch the chain 20, for example, from one of smaller diameter sprockets 2 through 5 to the low speed sprocket 1 of maximum diameter, the derailleu, if poorly adjusted or malfunctions, occasionally may cause the chain 20 to be shifted excessively axially outwardly with respect to the sprocket 1. When this occurs, even if the chain 20 rides over and comes off the sprocket 1, the projection 14 stops the chain 20 from falling into and becoming jammed between the sprocket 1 and the spokes 33 or hub flange 32 shown in FIG. 9.

Completing the description of FIG. 9, reference numeral 34 designates a hub shaft; 35, a hub shell which has the hub flange 32 and a hub flange 36 opposite thereto and has the cylindrical bearing member 31 extending axially outwardly of the hub flange 32; 37 and 38, balls supporting the hub shell 35 rotatably to the hub shaft 34; 39 and 40, ball holders; 41 and 42, lock nuts therefor; and 43 and 44, tightening nuts for fixing the hub shaft 34 to the bicycle frame (not shown).

In addition, the projections 14, which are provided only at the low speed sprocket 1 of maximum diameter in the previous embodiments, may be provided also at the high speed sprocket 5 of minimum diameter as shown in FIG. 10.

Also, the described embodiments have been of a multi-stage sprocket assembly applied to the rear hub, but the assembly, when applied to the crank mechanism may be constructed similarly.

As clearly understood from the aforesaid description, when the derailleur is controlled to change the bicycle speed, even if the chain rides over and comes off the sprocket, the projections at the sprocket can reliably stop the chain, thereby avoiding trouble caused by the chain becoming jammed between the sprocket and the spoke or hub flange.

Furthermore, since the conventional spoke protector or chain guard is not used, the multi-stage sprocket assembly of the invention has a reduced weight and is inexpensive to produce, and is able not only to prevent chain fall off and jamming but prevents an increase in the amount of hub center offset.

While preferred embodiments of the invention have been described, such description is for illustrative purpose only, and it is to be understood that changes and variations may be made without departing from the spirit or scope of the invention which is defined solely by the following claims.

What is claimed is:

1. A multi-stage sprocket assembly for use with a driving chain of a bicycle, comprising at least two different diameter sprockets having a large number of teeth for meshing with a driving chain and a connecting member for connecting said sprockets together in axial alignment with regular intervals therebetween, at least one of the axially outermost sprockets of said connected sprockets being provided at the laterally outer surface of its body with a plurality of projections, said projections extending axially outwardly of said at least one sprocket in a direction away from said connected sprockets and positioned circumferentially of said body and radially inwardly of the dedendum circle of said at least one sprocket, said projections receiving a shifted chain which rides over said one sprocket.

2. The multi-stage sprocket assembly according to claim 1, wherein said projections are formed as axially extending short column-like shapes.

3. The multi-stage sprocket assembly according to claim 2, wherein said projections have column-like shapes and have flanges at their utmost extending ends.

4. The multi-stage sprocket assembly according to claim 3 wherein said flanges have a diameter smaller than the interval between rollers of a driving chain.

5. The multi-stage sprocket assembly according to claim 1, wherein said projections are formed of plate members.

6. The multi-stage sprocket assembly according to claim 5, wherein said plate members are formed as an extension perpendicular to and integral with said sprocket body.

7. The multi-stage sprocket assembly according to claim 1, wherein each of said projections is provided on the line connecting the center of a tooth thickness of said one sprocket and the rotation center thereof.

8. The multi-stage sprocket assembly according to claim 1 wherein said projections are provided on both axially outermost sprockets of said assembly.

* * * * *